United States Patent [19]

Matsuura et al.

[11] 4,239,793

[45] Dec. 16, 1980

[54] GAS SEPARATION MEMBRANE

[75] Inventors: Junichi Matsuura, Kamakura; Yukio Yamaguchi, Tokyo, both of Japan

[73] Assignee: Mitsubishi Chemical Industries Ltd., Tokyo, Japan

[21] Appl. No.: 950,442

[22] Filed: Oct. 11, 1978

[30] Foreign Application Priority Data

Oct. 14, 1977 [JP] Japan .................................. 52-123183

[51] Int. Cl.$^2$ ..................... B32B 15/06; B01D 59/12; B01D 13/00
[52] U.S. Cl. ........................................ 428/216; 55/16; 55/158; 428/218; 428/304; 428/320; 428/447; 521/27; 525/100; 525/477; 525/478
[58] Field of Search .................... 55/158, 16; 260/825; 525/100, 477, 478; 428/447, 304, 315, 216, 218, 320; 521/27

[56] References Cited

U.S. PATENT DOCUMENTS

| | | | |
|---|---|---|---|
| 3,274,750 | 9/1966 | Robb | 55/16 |
| 3,754,375 | 8/1973 | Bouchilloux | 55/158 |
| 3,762,136 | 10/1973 | Kimura | 55/158 |
| 3,767,737 | 10/1973 | Lundstrom | 55/158 |
| 3,797,202 | 3/1974 | Neulander | 55/158 |

Primary Examiner—Ellis P. Robinson
Attorney, Agent, or Firm—Oblon, Fisher, Spivak, McClelland & Maier

[57] ABSTRACT

A gas separation membrane comprises a main component of a mixture of a polyvinyltriorganosilane and an organopolysiloxane.

The gas separation membrane has a dense layer having a gas selective permeability and a thickness of 0.01 to 10μ and a porous layer having open pores and a thickness of greater than 10μ.

7 Claims, 1 Drawing Figure

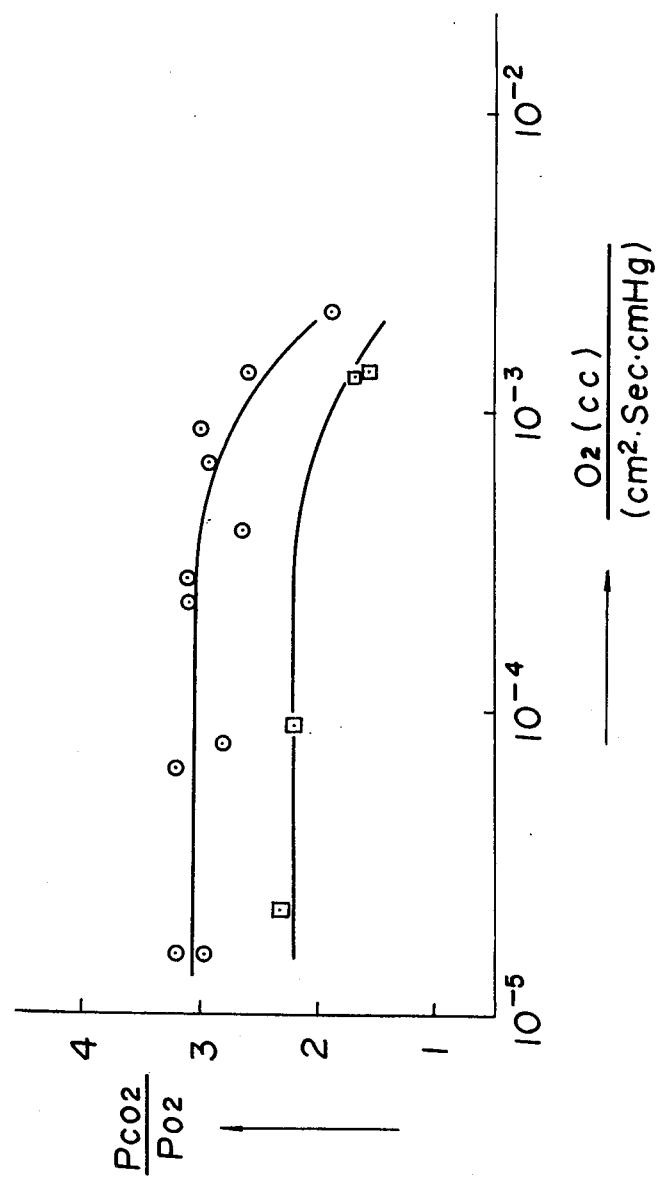

GAS SEPARATION MEMBRANE

BACKGROUND OF THE INVENTION

1. Field of the Invention

The present invention relates to a gas separation membrane. More particularly, it relates to a gas separation membrane which consists essentially of a mixture of a polyvinyltriorganosilane and an organopolysiloxane. The gas separation membrane is called a permselective membrane.

2. Description of Prior Art

Sometimes, it requires to enrich or to separate a specific gas from a gaseous mixture, for example, in a preparation of oxygen enriched air for a combustion, a medical use and a sewage treatment; in a separation or a recovery of helium gas from a natural gas or the other gas and in a separation of hydrogen gas from a mixed gas obtained a thermal cracking of a coal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 1 shows the results of ratios of permeation velocities of $CO_2/O_2$ to the permeation velocity of $O_2$ on the membrane obtained in Reference 2 and the membrane obtained in Examples 1-11, wherein the symbol —⊙— designates the results of the membrane of the present invention and —▣— designates the results of a prior art polyvinyl trimethyl silane membrane.

Certain membranes made of a synthetic polymer have been used for such purposes.

A characteristic of the gas separation membrane is evaluated depending upon a gas separation factor (selective permeability) and a gas permeation velocity (gas permeation rate).

The gas permeation velocity is given by a volume of a gas permeating through a unit area of a membrane for a unit time. Accordingly, where a pressure difference between both sides of the membrane is constant, the gas permeation velocity through the membrane is dependent upon a character of the membrane material for permeating a gas (permeation coefficient) and a thickness of the membrane. Thus, the optimum result can be expected by using a membrane material having high permeation coefficient for the specific gas and using a membrane having thinner thickness to be durable under the pressure difference.

However, the conventional membrane materials have disadvantages that a large area of a membrane is required to cause high cost for a gas separation and to be difficult to use it in an industrial operation because of difficulty of a fabrication of a thin membrane, unsatisfactory gas permeation coefficient and low gas permeation velocity.

It has been known that organopolysiloxanes are one of polymers having high gas permeation coefficient. However, when an organopolysiloxane is fabricated into a membrane having a thickness of less than several tens microns, nonuniformity of thickness and pin holes are caused whereby satisfactory gas separating characteristics are not attained.

On the other hand, polyvinyltriorganosilane can be fabricated into a membrane having thin thickness (Japanese Patent Publication No. 21021/1977) in comparison with organopolysiloxanes however, gas separating characteristics are not satisfactory in the region of high permeation velocity.

Accordingly, it has been desired to obtain a membrane having high permeation velocity and excellent selectivity, even in the high permeation velocity.

SUMMARY OF THE INVENTION

It is an object of the present invention to provide a gas separation membrane having high permeable velocity and excellent selectivity in a gas separation.

It is another object of the present invention to provide a gas separation membrane having high durability under pressure difference in thin thickness.

It is the other object of the present invention to provide a gas separation membrane having satisfactory gas permeation coefficient.

The foregoing and other objects of the present invention have been attained by providing a gas separation membrane prepared by using a mixture of a polyvinyltriorganosilane and an organopolysiloxane.

DETAILED DESCRIPTION OF THE PREFERRED EMBODIMENTS:

The gas separation membrane of the present invention comprises a main component of a mixture of a polyvinyltriorganosilane and an organopolysiloxane at a ratio of 1:0.05 to 1 by weight and has a dense layer having gas selective permeability and an average thickness of 0.01 to 10μ and a porous layer having open pores and an average thickness of greater than 10μ.

The gas separation membrane of the present invention has significantly higher permeation velocity than that of the organopolysiloxane membrane and higher separation factor in the condition of higher permeation velocity than those of the polyvinyltriorganosilane membrane.

The gas separation membranes of the present invention can be easily fabricated by the following method.

The polyvinyltriorganosilane used in the present invention has plural units wherein each unit has a formula

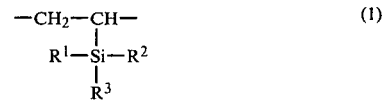

(1)

wherein $R^1$ represents hydrogen atom, an alkyl, a cycloalkyl or an aryl group; $R^2$ and $R^3$ represent an alkyl, a cycloalkyl or an aryl group and $R^1$, $R^2$ and $R^3$ can be the same or different.

The polyvinyltriorganosilane can be produced by polymerizing one or more vinyltriorganosilane in the presence of a suitable catalyst.

Suitable vinyltriorganosilanes include vinyltrimethylsilane, vinyltriethylsilane, vinyltripropylsilane, vinyltributylsilane, vinyldimethylethylsilane, vinyldimethylpropylsilane, vinyldiethylpropylsilane, vinyltricyclohexylsilane, vinyldimethylcyclohexylsilane and vinyldimethylphenylsilane.

The polyvinyltriorganosilanes used in the present invention can contain less than 25 wt. % of the other units beside the units having the formula (1).

The other unit can be any unit such as unit of other vinyl monomers and diene monomers e.g. styrene, butadiene, and isoprene.

The polyvinyltriorganosilane can be a mixture of two or more kinds of polyvinyltriorganosilanes.

The intrinsic viscosity of the polyvinyltriorganosilane used in the present invention is usually greater than 50 cm$^3$/g preferably 70 to 200 cm$^3$/g at 25° C. in cyclohexane.

The organopolysiloxane used in the present invention will be illustrated.

The organopolysiloxane is a compound having Si-O-Si bond and has at least one of the following units

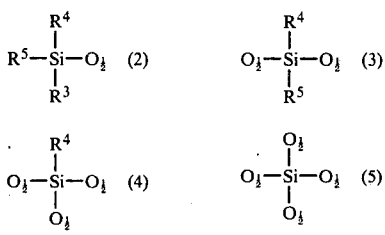

wherein $R^4$, $R^5$ and $R^6$ independently represent an alkyl group such as methyl, ethyl, t-butyl and octadecyl groups; an alkenyl group such as vinyl, allyl and butadienyl groups; a cycloalkyl group such as cyclopentenyl, cyclohexenyl and dicyclopentadienyl groups; an aryl group such as phenyl and naphthyl groups; an aralkyl group such as benzyl, xylyl and an alkyl aryl group such as tolyl group; or a halogen containing alkyl, alkenyl, cycloalkyl, aryl, aralkyl or alkyl aryl group such as chloromethyl, bromophenyl and trifluoromethyl groups; an alkoxy group such as methoxy, ethoxy, butoxy groups; hydroxy group or hydrogen atom and $R^4$, $R^5$ and $R^6$ can be the same or different and can form a ring by the two functional groups and $O_{\frac{1}{2}}$ represents oxygen atom connected to two Si atoms in —Si—O—SI— bond.

The organopolysiloxane used in the present invention can be a mixture of two or more kinds of the organopolysiloxanes.

The organopolysiloxane can be a mixture of the organopolysiloxane and additives which are usually incorporated in commercial products.

The organopolysiloxanes can be compounds having low molecular weight to high molecular weight and are not preferably compounds having a low boiling point and it is preferable to use organopolysiloxanes having an average molecular weight of higher than 10,000.

In the case of liquid organopolysiloxanes a viscosity at 25° C. is preferably in a range of 100 to 1,000,000 cp.

The organopolysiloxanes which can be easily available and can be used in the present invention, include organopolysiloxanes having main units having the formula

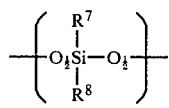

wherein $R^7$ and $R^8$ independently represent hydrogen atom, methyl, ethyl, propyl, butyl, vinyl or phenyl group. The number of the main units is usually 200 or more than 200 and $R^7$ can be different and $R^8$ can be also different in these main units. In one unit, $R^7$ and $R^8$ are usually the same, though it is not limited.

Suitable organopolysiloxanes includes $(CH_3)_3\text{-SiO}[Si(CH_3)_2O]_n Si(CH_3)_3$,
$(C_2H_5)_3\text{-SiO}[Si(CH_3)_2O]_n Si(C_2H_5)_3$,
$(CH_3)_3 SiO[Si(CH_3)_2O]_n[Si(C_6H_5)_2O]_m Si(CH_3)_3$,
$(CH_3)_3 SiO[Si(CH_3)_2O]_n[Si(CH_3)(CH_2=CH)O]_m Si(CH_3)_3$,
$(CH_3)_3 SiO[Si(CH_3)_2O]_n[SiH(CH_3)O]_m Si(CH_3)_3$,
$(HO)(CH_3)_2 SiO[Si(CH_3)_2O]_n Si(CH_3)_2(OH)$,
$(HO)(CH_3)_2 SiO[Si(CH_3)_2O]_n[Si(C_6H_5)_2O]_m$ wherein n and m represent 1 or more than 1 and l represent 3 or more than 3.

The organopolysiloxanes can be liquid to non-flowable rubbers having a polymerization degree of 10000 or more and can be a mixture of organopolysiloxanes having different value of l, m or n and can be also crosslinked organopolysiloxane.

Some of these organopolysiloxanes are commercialized as silicone oils and silicone rubber.

A ratio of the polyvinyltriorganosilane to the organopolysiloxane is 1:0.05 to 1 by weight preferably 1:0.1 to 0.4 by weight.

The effect of the organopolysiloxane is increased by increasing the ratio of the organopolysiloxane whereas the strength of the membrane is decreased and a defect of the membrane is caused and a separation factor is inferior if the ratio of the organopolysiloxane is too high.

On the other hand, a maximum permeation velocity under satisfactory separation factor is decreased if the ratio of the organopolysiloxane is too low wherein the maximum permeation velocity means a permeation velocity at the limit of an elimination of a separation factor of the membrane in decreasing a thickness of the membrane.

The gas separation membrane of the present invention comprises a mixture of the polyvinyltriorganosilane and the organopolysiloxane as the membrane material and can incorporate an organic or inorganic additive in a range for maintaining the characteristics as the gas separation membrane.

The membrane can be reinforced with a reinforcing substrate such as nonwoven fabric of a natural fiber or a synthetic fiber such as polyamide and polyester.

The gas separation membrane of the present invention can be a single layer of a dense layer having a gas selectivity. However, it is preferable to be a gas separation membrane having double layers of a dense layer having gas selectivity and a porous layer having non-selective gas permeability since a membrane having high permeation velocity and excellent separation factor can be easily obtained. The dense layer means a non-porous layer having high density which has a selective permeability to gas or vapor being substantially the same with those of the material of the layer. (The main component of the mixture of the polyvinyltriorganosilane and the organopolysiloxane.) The porous layer means a layer made of the same material for the dense layer and having open pores and sponge type structure through which a gas is freely passed and having non-selective permeability to gas or vapor passing through the layer since the gas or vapor is passed through the holes.

A thickness of the dense layer is preferable in a range of 0.01 to 10μ and a thickness of the porous layer is preferably thicker than 10μ especially 50 to 1000μ from the viewpoint of the mechanical strength of the membrane. When another porous membrane is used to reinforce the membrane of the present invention, the thickness of the membrane can be further thinner. The thickness of the dense layer can be measured by comparing the permeation velocity of the membrane with the permeation coefficient of the material for the membrane. The thickness of the porous layer can be measured by subtracting the thickness of the dense layer from the total thickness of the membrane.

The gas separation membrane having the dense layer and the porous layer can be prepared by the following process.

(a) The organopolysiloxane and the polyvinyltriorganosilane were mixed and dissolved in a three component solvent containing two kinds of solvents for the polymers which have a difference of a boiling point of at least 30° C. and a non-solvent for the polymers which have higher boiling point than that of more volatile solvent (it is referred to as light solvent) and spreading the resulting solvent on a holder (the solvent having lower volatility among the two kinds is referred to a heavy solvent);

(b) removing a whole or a part of the light solvent;

(c) treating the resulting membrane in a coagulating liquid (non-solvent); and (d) drying the membrane.

The light solvent and the heavy solvent can be selected from aliphatic and aromatic hydrocarbons such as cyclohexane, benzene and toluene and halogenated hydrocarbons such as dichloromethane, dichloroethylene, tetrachloroethylene, chloroform, dichlorobenzene and monochlorobenzene.

The non-solvent can be water and alcohols such as methanol, ethanol and primary, secondary or tertiary butanols.

Certain examples of the three component mixture are as follows.
toluene-dichloromethane-isobutanol;
benzene-dichloromethane-isobutanol;
monochlorobenzene-dichloromethane-isobutanol;
toluene-chloroform-isobutanol; and
toluene-dichloromethan-secondary butanol.

The order of the additions of the organopolysiloxane and the polyvinyltriorganosilane in the preparation of the solution of them in the three component mixture is not limited.

The holder or the supporter used for fabricating the membrane by spreading the solution is not limited and can be a plate such as glass plate in a batch system and a metallic belt in a continuous system. A flat membrane and a tubular membrane can be obtained depending upon on a shape of the holder or the supporter.

The ratio of the light solvent removed in the step of removing the light solvent is dependent upon a thickness of the dense layer.

A thinner dense layer can be obtained when the ratio of the light solvent removed in the step is lower.

In general, it is preferable to remove 10 to 50 wt.% of the light solvent depending upon the evaporation time and it can be less than 10 wt.% or more than 50 wt.%. The gas permeation velocity for the membrane is dependent upon the thickness of the dense layer and the step of removing the light solvent is important for controlling the gas permeation velocity.

In order to prepare a membrane having high gas permeable velocity, the ratio of the light solvent is decreased and the thickness of the dense layer of the membrane is thinner. On the other hand, if the thickness of the dense layer is too thin, it disadvantageously causes a defect in the dense layer (the defect means the condition of the membrane whose separation factor for gases is lost because the same permeable velocity is given for the different gases for the separation). It is preferable to control the ratio of the light solvent removed so as to prevent such defect.

A coagulating liquid is used for the purpose of a gellation of the polymer solution. When a formation of a gel is found by evaporating the light solvent, the coagulating liquid is useful for completing the formation of the gel. Accordingly, the coagulating liquid is selected from solvents being miscible to the light solvent, the heavy solvent and the non-solvent.

The gellation is preferably continued until eluting the solvents from the coagulated membrane as far as possible. Of course, the gellation can be performed in a batch system or in a continuous system.

Suitable coagulating liquids include methanol, ethanol, methanol-ethanol mixture, and water-methanol mixture.

A dipping time is not limited and can be enough to elute most of the solvents incorporated in the polymer solution and it is preferable to be 10 minutes to 1 hour or more at room temperature.

In the next step, the coagulated membrane is dried at an ambient temperature or higher. Thus, the solvents and the nonsolvent are removed to obtain a gas separation membrane of the present invention.

It is possible to perform a heat treatment at lower than 200° C. preferably 100° to 180° C. after removing the solvents and the nonsolvent. The membrane can be contracted by the heat treatment so as to control the gas permeation characteristics.

The gas separation membrane of the present invention has excellent gas selectivity and excellent mechanical strength and excellent handling property to be used in an industrial use and it can be used in many fields for enriching a specific gas from the mixed gases.

The advantageous fields for the utilization of the gas separation membrane of the present invention include a recovery of helium from natural gases; a concentration of hydrogen from a gas flow discharged from hydrogenation (separation of hydrogen from methane and/or carbon monoxide); a concentration of oxygen in air for using it for an oxidation or for a combustion with a concentrated oxygen of air; and a concentration of oxygen of air for the medical uses. The gas separation membrane is suitable for separating such gas from a mixture of oxygen, nitrogen, hydrogen carbon dioxide, carbon monoxide, helium, argon, methane and other gases.

A further understanding can be attained by reference to certain examples which are provided herein for purposes of illustration only and are not intended to be limiting in any substance and manner, unless otherwise specified.

REFERENCE 1

A porous membrane of a Millipore filter VSWP09025 (trade name manufactured by Nippon Millipore Limited) was dipped in a toluene solution of an organopolyalkylsiloxane having mainly methyl groups as alkyl groups and having main units having the formula

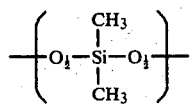

and having a viscosity of 1100 cp at 25° C., for 5 minutes and the membrane was taken up and dried and the gas permeation velocity was measured.

In the measurement of the gas permeation velocity, the sample membrane was set on a tester and the specific gas was pressurized to 0.5 Kg/cm$^2$ gauge from one side of the membrane at 25° C. and the volume of the gas permeated and discharged to the other side for a specific time was measured by a gas buret and the permeation velocity was calculated.

The thickness of the membrane of the organopolysiloxane was calculated from the permeation coefficients of the gases to the membrane.

$$P_{co2} = 2800 \times 10^{-10} \frac{cc\,(STP) \cdot cm}{cm^2 \cdot sec \cdot cmHg}$$

$$P_{o2} = 500 \times 10^{-10} \frac{cc\,(STP) \cdot cm}{cm^2 \cdot sec \cdot cmHg}$$

$$P_{N2} = 130 \times 10^{-10} \frac{cc\,(STP) \cdot cm}{cm^2 \cdot sec \cdot cmHg}$$

The results of the permeation velocity and the thickness of the membrane are shown in Table 1.

TABLE 1

| Components in Solution | | Gas permeation velocity ($\frac{cc(STP)}{cm^2 \cdot sec \cdot cmHg}$) | | | Ratio of permeation velocity | | Thickness of membrane |
|---|---|---|---|---|---|---|---|
| polysiloxane | toluene | $CO_2$ | $O_2$ | $N_2$ | $CO_2/O_2$ | $O_2/N_2$ | |
| 10 g | 10 ml | $5.4 \times 10^{-6}$ | $1.1 \times 10^{-6}$ | $4.8 \times 10^{-7}$ | 4.9 | 2.3 | 500–550μ |
| 2 g | 10 ml | $6.5 \times 10^{-5}$ | $1.3 \times 10^{-5}$ | $5.4 \times 10^{-6}$ | 5.0 | 2.4 | 40–50μ |
| 1 g | 20 ml | — | — | — | 1 | 1 | — |

REFERENCE 2

Polyvinyltrimethylsilane having an intrinsic viscosity of 100 cm$^3$/g was obtained by polymerizing vinyltrimethylsilane with a catalyst of n-butyl lithium.

In accordance with the process of Japanese Patent Publication of 21021/1977, the polyvinyltrimethylsilane was fabricated into a membrane. That is, 6.0 g of the polyvinyltrimethylsilane was dissolved by adding 15.0 g of toluene and then, 17.4 g of dichloromethane and a uniform solution was obtained by adding 9.6 g of isobutanol.

The solution was spread on a glass plate to form a membrane having a thickness of 500μ and it was kept in air at room temperature to evaporate mainly dichloromethane and then, the membrane supported on the glss plate was dipped in methanol bath at room temperature. After 15 minutes, the glass plate was taken up from the bath and the membrane was dried in air. The evaporating time of dichloromethane was varied to 30 sec., 1 min., 2 min., and 3 min. and the thickness of the dense layers of the resulting membranes were controlled.

The permeation velocities of $CO_2$, $O_2$ and $N_2$ through the resulting polyvinyltrimethylsilane membranes were measured as the same with Reference 1. The results are shown in Table 2.

TABLE 2

| Evaporation time of dichloromethane | Gas permeation velocity $\frac{cc(STP)}{cm^2 \cdot sec \cdot cmHg}$ | | | Ratio of permeation velocity | |
|---|---|---|---|---|---|
| | $CO_2$ | $O_2$ | $N_2$ | $CO_2/O_2$ | $O_2/N_2$ |
| 3 min. | $7.7 \times 10^{-5}$ | $3.4 \times 10^{-5}$ | $1.1 \times 10^{-5}$ | 2.3 | 3.1 |
| 2 min. | $2.1 \times 10^{-4}$ | $9.5 \times 10^{-5}$ | $3.2 \times 10^{-5}$ | 2.2 | 3.0 |
| 1 min. | $1.9 \times 10^{-3}$ | $1.1 \times 10^{-3}$ | $6.0 \times 10^{-4}$ | 1.7 | 1.8 |
| 30 sec. | $1.9 \times 10^{-3}$ | $1.2 \times 10^{-3}$ | $9.5 \times 10^{-4}$ | 1.6 | 1.3 |

EXAMPLES 1 to 7

Polyvinyltrimethylsilane having an intrinsic viscosity of 122 cm$^3$/g was obtained by polymerizing vinyltrimethylsilane with a catalyst of n-butyl lithium.

Then, 1.00 g of the polyvinyltrimethylsilane was added to the specific amount of an organopolyalkylsiloxane having mainly methyl groups as alkyl groups and having main units having the formula

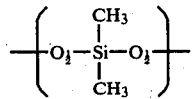

and having a viscosity of 1100 cp at 25° C. and they were dissolved in a mixed solvent of 5.0 g of toluene and 5.8 g of dichloromethane and then, a uniform solution was prepared by adding 3.2 g of isobutanol.

The solution was spread on a glass plate to form a membrane having a thickness of 500μ and it was kept in air for 1 minute to evaporate mainly dichloromethane and then, the membrane supported on the glass plate was dipped in methanol bath at room temperature. After 15 minutes, the glass plate was taken up from the bath and the membrane was dried in air. The permeation velocities of $CO_2$, $O_2$, and $N_2$ through each resulting membrane were measured as the same with Reference 1. The results are shown in Table 3.

A thickness of a dense layer of the membrane was measured by the following method and a thickness of a porous layer was calculated by subtracting the thickness of the dense layer from the total thickness of the membrane measured by a film thickness tester. The results are shown in Table 3.

A uniform membrane (dense layer) (relatively thick) was prepared by using the same solution and the ratio of the thicknesss of the membrane to the gas permeation velocity was obtained and the permeation velocity of each resulting membrane was compared to calculate the thickness of the dense layer of the resulting membrane.

TABLE 3

| Example | | 1 | 2 | 3 | 4 | 5 | 6 | 7* |
|---|---|---|---|---|---|---|---|---|
| Polyvinyltrimethylsilane | | 1.00 g | 1.00 g | 1.00 g | 1.00 g | 1.00 g | 1.00 g | 1.00 g |
| Organopolysiloxane | | 0.20 g | 0.20 g | 0.30 g | 0.40 g | 0.40 g | 0.40 g | 0.11 g |
| Gas permeation | $CO_2$ | $1.1 \times 10^{-3}$ | $1.3 \times 10^{-3}$ | $2.8 \times 10^{-3}$ | $2.4 \times 10^{-3}$ | $3.1 \times 10^{-3}$ | $6.1 \times 10^{-3}$ | $5.7 \times 10^{-4}$ |

TABLE 3-continued

| Example | | 1 | 2 | 3 | 4 | 5 | 6 | 7* |
|---|---|---|---|---|---|---|---|---|
| velocity ($\frac{cc(STP)}{cm^2 \cdot sec \cdot cmHg}$) | $O_2$ | $3.6 \times 10^{-4}$ | $4.4 \times 10^{-4}$ | $9.3 \times 10^{-4}$ | $8.2 \times 10^{-4}$ | $1.2 \times 10^{-3}$ | $3.3 \times 10^{-3}$ | $1.9 \times 10^{-4}$ |
| | $N_2$ | $1.5 \times 10^{-4}$ | $2.0 \times 10^{-4}$ | $4.3 \times 10^{-4}$ | $3.4 \times 10^{-4}$ | $5.9 \times 10^{-4}$ | $1.7 \times 10^{-3}$ | $6.2 \times 10^{-5}$ |
| Ratio of permeation velocity | $CO_2/O_2$ | 3.1 | 3.0 | 3.0 | 2.9 | 2.6 | 1.8 | 3.0 |
| | $O_2/N_2$ | 2.4 | 2.2 | 2.2 | 2.4 | 2.0 | 1.9 | 3.1 |
| Thickness of dense layer ($\mu$) | | 0.17 | 0.14 | 0.08 | 0.11 | 0.08 | 0.03 | — |
| Thickness of porous layer ($\mu$) | | 67 | 110 | 68 | 132 | 185 | 95 | — |

*Exp. 7 polyvinyltrimethylsilane having intrinsic viscosity of 137 cm$^3$/g was used and the evaporation time of dichloromethane was 3 min.

EXAMPLES 8 to 10

In the examples, 1.50 g of polyvinyltrimethylsilane having an intrinsic viscosity of 116 cm$^3$/g was mixed with 0.30 g of organopolysiloxane of Example 1 and they were mixed with 3.75 g of toluene, 4.35 g of dichloromethane and 2.40 g of isobutanol to prepare each uniform solution.

In accordance with the process of Example 1 except varying the evaporation time of dichloromethane, each membrane was fabricated by using the solution and the permeation velocities of $CO_2$, $O_2$ and $N_2$ through each membrane were measured in accordance with the method of Reference 1. The results are shown in Table 4.

TABLE 4

| Example | Evaporation time of dichloromethane | Gas permeation velocity ($\frac{cc(STP)}{cm^2 \cdot sec \cdot cmHg}$) | | | Ratio of permeation velocity | |
|---|---|---|---|---|---|---|
| | | $CO_2$ | $O_2$ | $N_2$ | $CO_2/O_2$ | $O_2/N_2$ |
| 8 | 3 min. | $6.4 \times 10^{-5}$ | $2.0 \times 10^{-5}$ | $7.4 \times 10^{-6}$ | 3.2 | 2.7 |
| 9 | 1 min. | $2.6 \times 10^{-4}$ | $8.1 \times 10^{-5}$ | $3.1 \times 10^{-5}$ | 3.2 | 2.6 |
| 10 | 30 sec. | $2.4 \times 10^{-4}$ | $8.9 \times 10^{-5}$ | $3.5 \times 10^{-5}$ | 2.7 | 2.5 |

EXAMPLE 11

In the example, 1.00 g of polyvinyltrimethylsilane of Example 7 was mixed with 0.21 g of the organopolysiloxane of Example 1 and a uniform solution was prepared by adding 6.25 g of toluene, 7.25 g of dichloromethane and 4.00 g of isobutanol.

In accordance with the process of Example 1 except using the solution for 3 minutes of the evaporation time of dichloroethane, a membrane was fabricated. The permeation velocities of $CO_2$, $O_2$ and $N_2$ through the resulting membrane were measured in accordance with the method of Reference 1. The results are as follows.

| Gas permeation velocity ($\frac{cc(STP)}{cm^2 \cdot sec \cdot cmHg}$) | | | Ratio of permeation velocity | |
|---|---|---|---|---|
| $CO_2$ | $O_2$ | $N_2$ | $CO_2/O_2$ | $O_2/N_2$ |
| $1.6 \times 10^{-3}$ | $6 \times 10^{-4}$ | $2.4 \times 10^{-4}$ | 2.7 | 2.5 |

EXAMPLE 12

In this example, 1.00 g of polyvinyltrimethylsilane of Reference 7 was mixed with 0.30 g of the organopolysiloxane of Example 1, and a uniform solution was prepared by adding 5.0 g of toluene, 5.8 g of dichloromethane and 3.2 g of isobutanol.

In accordance with the process of Example 1 except using the solution for 1 minute of the evaporation time of dichloroethane, a membrane was fabricated.

The permeation velocities of $CO_2$, $O_2$, $N_2$, $H_2$, He and Ar through the resulting membrane was measured in accordance with the method of Reference 1. The results are as follows.

| | Gas permeation velocity ($\frac{cc(STP)}{cm^2 \cdot sec \cdot cmHg}$) | | | | | |
|---|---|---|---|---|---|---|
| | $CO_2$ | $O_2$ | $N_2$ | $H_2$ | He | Ar |
| Exp. 12 | $2.1 \times 10^{-3}$ | $7.0 \times 10^{-4}$ | $3.3 \times 10^{-4}$ | $2.0 \times 10^{-3}$ | $1.5 \times 10^{-3}$ | $6.0 \times 10^{-4}$ |

FIG. 1 shows the results of the ratios of the permeation velocities of $CO_2/O_2$ to the permeation velocity of $O_2$ on the polyvinyltrimethylsilane membrane obtained in Reference 2 and the membrane of a mixture of polyvinyltrimethylsilane and organopolysiloxane obtained in Examples 1 to 11 wherein the symbol -⊙- designates the results of the membrane of the present invention and -[•]- designates the results of polyvinyltrimethylsilane membrane.

What is claimed is:

1. A gas separation membrane which comprises a mixture of (A) a polyvinyltriorganosilane having main units of the formula $$-CH_2-CH- \atop {\underset{R^3}{\underset{|}{\overset{|}{\underset{|}{R^1-Si-R^2}}}}} \qquad (1)$$

wherein $R^1$ represents a hydrogen atom, an alkyl, a cycloalkyl or an aryl group, and $R^2$ and $R^3$ independently represent an alkyl, a cycloalkyl or an aryl group; and (B) an organopolysiloxane having main units selected from the group consisting of:

$$R^5-\underset{R^3}{\underset{|}{\overset{R^4}{\overset{|}{Si}}}}-O_{1/2} \qquad O_{1/2}-\underset{R^5}{\underset{|}{\overset{R^4}{\overset{|}{Si}}}}-O_{1/2}$$

(2), (3)

-continued

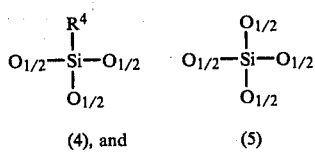

(4), and (5)

wherein $R^4$, $R^5$ and $R^6$ are selected from the group consisting of alkoxy, hydroxy, hydrogen, and the same or different unsubstituted or halogen-substituted alkyl, alkenyl, cycloalkyl, aryl, aralkyl or alkaryl groups; or $R^4$, $R^5$, $R^6$ taken together may form a ring, and $O_{\frac{1}{2}}$ represents an oxygen atom connected to two Si atoms in a Si—O—Si bond; wherein the ratio of polyvinylorganosilane and organopolysiloxane is 1:0.05 to 1 by weight; and wherein the viscosity of the polysilane is greater than about 50 cm³/g.

2. A gas separation membrane according to claim 1 wherein the organopolysiloxane has a viscosity of 100 to 1,000,000 cp at 25° C. and a molecular weight of higher than 10,000 and said organopolysiloxane is completely combined with said polyvinyltriorganosilane to form a solid membrane.

3. A gas separation membrane according to claim 1 wherein the organopolysiloxane has main units having the formula

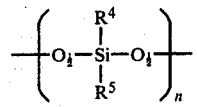

wherein n represents an integer.

4. A gas separation membrane according to claim 1 wherein the organopolysiloxane has main units having the formula

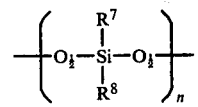

wherein $R^7$ and $R^8$ independently represent a hydrogen atom, a methyl, ethyl, propyl, butyl, vinyl or phenyl group and $O_{\frac{1}{2}}$ represents oxygen atom connected to Si atom in —SI—O—SI— bond and n represents an integer.

5. A gas separation membrane according any of claims 1-4, wherein the membrane comprises a main component of a mixture of the polyvinyltriorganosilane and the organopolysiloxane at a ratio of 1:0.1 to 0.4 by weight.

6. A gas separation membrane according to any of claims 1-4, wherein the membrane is formed by a dense layer having a gas selective permeability and a porous layer having open pores.

7. A gas separation membrane according to claim 6, wherein the dense layer has an average thickness of 0.01 to 10μ and the porous layer has an average thickness of greater than 10μ.

* * * * *